April 19, 1966 R. HAYDEN 3,247,402
FLASHER SWITCH
Filed Nov. 7, 1963
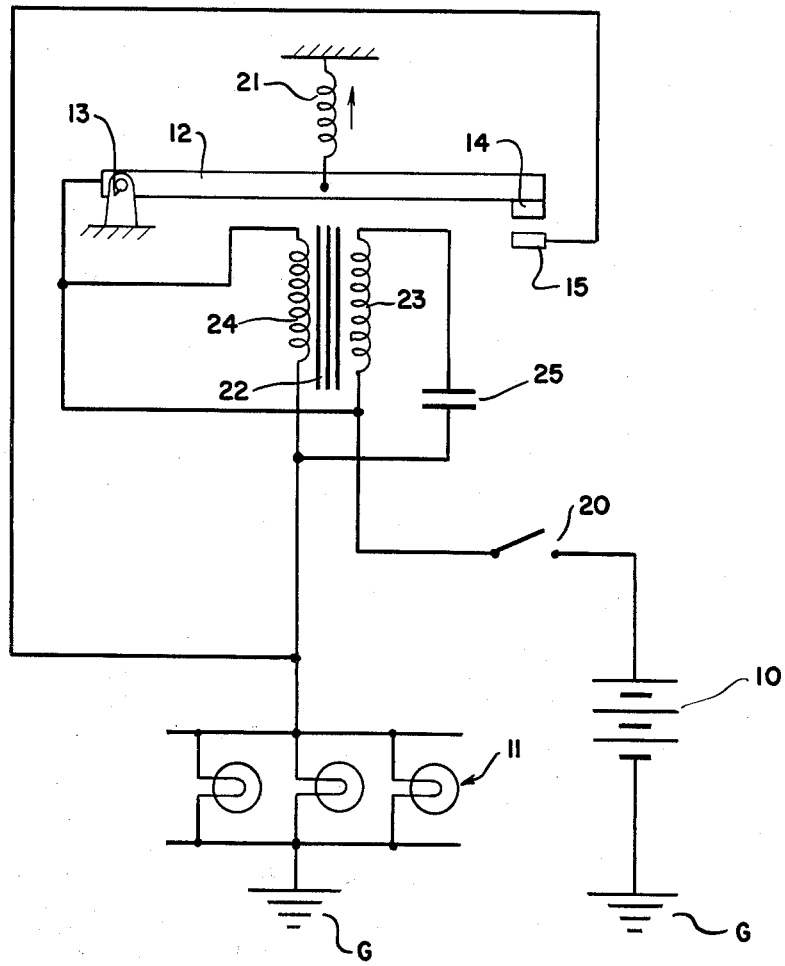
INVENTOR.
RODNEY HAYDEN
BY
Cullen, Sloman & Cantor
ATTORNEYS

United States Patent Office 3,247,402
Patented Apr. 19, 1966

3,247,402
FLASHER SWITCH
Rodney Hayden, Stoney Creek, Ontario, Canada, assignor to Tridon Manufacturing Limited, Hamilton, Ontario, Canada
Filed Nov. 7, 1963, Ser. No. 322,162
9 Claims. (Cl. 307—132)

This application is a continuation-in-part of my prior application, Ser. No. 136,665, filed September 7, 1961, now abandoned.

This application relates to flasher switches for use in flasher circuits, particularly to flasher circuits of the battery ground type and wherein the load to be flashed is a lamp load.

Flasher switches that have been commonly used for this purpose are the thermostatic type employing a hot wire or hot blade wherein current flow resistance produces heat expansion of the wire or blade to engage a contact of and close the lamp circuit. Energizing of the lamp circuit thereupon interrupts current flow through the wire or blade. In such flasher switches, the current consumption per lamp when the flasher circuit is operating is, in one known instance, 2.0 amps when the lamp is lit and 1.5 amps when it is dark. This means that the lamp is never completely dark but is dimmed, with consequent battery drain and lessening of lamp life.

Flashing lamp vehicle direction indicator systems have also been disclosed hitherto which incorporate a so-called contact device for flashing the lamps of the system. This contact device comprises two operating coils one of which has a capacitor connected in series therewith, and the other of which is connected in parallel with the said one coil and the series connected capacitor. The coils control the movement of an armature carrying a moving contact and biased to hold the moving contact against a fixed contact. When current is applied to the coils the capacitor begins to charge and the coils are so wound that they produce equal and opposite magnetic fields, so that the armature is not attracted, as long as the capacitor is charging. When the capacitor is charged the field produced by its associated series-connected coil decreases and the armature is attracted, whereupon the capacitor discharges through the said operating coils in series, the direction of the discharge current being such that the magnetic fields produced by the two coils are in the same direction and maintain the armature in the attracted position. The lamps of the system are on for the period that the armature is attracted.

The operating requirements for such a device intended for vehicle direction indicators are now substantially standardized and typically it should produce between 60 and 120 flashes per minute, preferably 90 flashes per minute, with the lamps being in their "lighted" condition ("on" duty cycle) for between 33% and 66% of the time, preferably 50% of the time.

It will be seen that in the known contact devices described above the capacitor is charged through one coil and discharged through two coils in series, and if the coils are of the same impedance the ratio of charge to discharge time cannot be less than 1: √2, corresponding to a duty cycle of 40% or 60%. In order to obtain a 50% duty cycle the impedance of the coil not having a capacitor in series therewith must be reduced considerably, and this produces consequent substantial manufacturing difficulties, since the coils are now dissimilar and yet must produce the same magnetic field, and being dissimilar they cannot be wound together. Moreover, the operating current requirement of the device is increased considerably.

A principal object of the present invention is to provide a flasher switch for lamp load flasher circuit of the battery to ground circuit type, in switch containing not a heated wire or blade, but rather a single moving part, namely a contactor actuated by a core magnetized by a circuit of core magnetizing coils and a capacitor, whereby the flasher action may be accomplished without the necessity for employing thermostats, rotors, or other mechanical flasher mechanisms. The flasher switch hereof is particularly adapted for use in connection with turn switch circuits which are by now standard equipment in automobiles.

In the device hereof, the current consumption per lamp when the flasher switch is operating in a related instance is 2.0 amps when the lamp is lit but reduced to 30 milliamps when the lamp is dark. This means that the lamp is completely dark and the current drain is negligible.

This advantage is also important otherwise as the flasher switch hereof will operate satisfactorily with old equipment where the circuit resistance is high, particularly in tractor-trailer equipment having many signal lamps.

In addition, the operating cycle of the flasher switch hereof is constant whereas is presently known heat-operated devices the flashing period fluctuates as heat builds up in the container or casing of the flasher.

The flasher switch hereof includes a movable armature which strikes a contact and such striking force is sufficient to give an extremely audible signal to the driver indicating that the flasher device is in operation.

In the preferred embodiment, the circuit of the flasher switch is composed of two parallel wound high resistance coils connected to produce opposing magnetic fields, a capacitor in series with the second of the coils, and a relay contact engaged by an armature or contactor which closes the circuit when either one of the coils is energized and produces an adequate magnetic flux. In such circuit, when the main switch is closed, current flows through one coil producing a magnetic field which tends to but does not yet move the armature, because simultaneously current flows through the other coil producing an opposing magnetic field, opposing the field produced by the first coil.

Current flows in the second coil until the capacitor in series therewith is charged. When current ceases to flow in the second coil, the magnetic field produced by this coil decays, allowing the first coil to move the armature to light the lamps and also at the same time to short out both coils.

When the first coil is shorted out, the magnetic field created thereby decays. At this point, the armature should be released, but because the second coil and its condenser are also shorted out, this results in the capacitor discharging through the second coil and producing a magnetic field which holds the armature in contact engaging position for a time. When the condenser has discharged sufficiently, the armature is released and the lamp circuit is opened and the flasher is ready to continue on the previously described cycle once more.

The value of the resistance coils is such that insufficient current will flow through either of these coils to permit even one lamp to become incandescent.

For an understanding of the invention, reference should be had to the appended drawing which discloses a preferred embodiment of the same shown by way of illustration.

In this drawing:

The drawing discloses diagrammatically a flasher switch of the invention connected in a flasher circuit.

The flasher circuit hereof is of the delayed action battery to ground lamp load type and hence includes a battery 10 and a lamp load 11 and ground connections G.

The flasher switch includes a movable contactor or armature 12 pivotally mounted at its end 13 and having a contact end 14 for engaging under proper circumstances a contact 15 connected to the lamp load 11. The pivotally anchored or left end of the contactor 12 is connected through a switch 20 to the battery 10.

Thus, it will be seen that the contact 15 and the contactor 12 are in series with each other and with the lamp load 11 and the battery 10.

Switch 20 is the master switch for the circuit and may be of any desired form. For example, it may be the conventional turn switch of the turn switch signal system of an automobile.

The device also includes a spring 21 for biasing the contactor 12 away from the contact 15.

The switch further includes a time delay mechanism for moving contact 14 against contact 15 with a time delay for prolonging the flashing intervals for which the contacts are in engagement with one another.

The time delay mechanism includes a magnetizable core 22 and opposed first and second balanced core magnetizing high resistance coils 23 and 24 with a capacitor 25 in series with the first coil 23. The two coils 23 and 24 normally oppose and balance out each other. The two coils and the capacitor 25 together are shunted across the contactor 12 and contact 15. Either one, but not both together, of the coils operate to overcome the force of spring 21 and to cause the core magnetically to move and hold the contactor 12 into contact engaging position, that is, in position to close the circuits between contacts 14 and 15 in opposition to the force of spring 21.

*Operation*

Assuming master switch 20 to be closed, the steps of the operation are as follows:

*Step A.*—While capacitor 25 is charging, spring 21 is not overcome by the combined opposing action of coils 23 and 24, since both coils are activated and cancel each other out. Thus, spring 21 maintains contactor 12 away from or out of contact with contact 15 so that lamps 11 remain dark.

*Step B.*—When capacitor 25 is fully charged, current flow through coil 23 stops and only coil 24 is activated. This causes core 22 to overcome the force of spring 21, moving contactor 12 to close contacts 14 and 15. Current shunts through contactor 12, around the coils, and to lamps 11 and lamps 11 now glow.

*Step C.*—With the closing of the contacts 14 and 15 the coils 23 and 24 are each shunted through a short circuit of substantially zero impedance constituted by the conductive contactor 12. The field of coil 24 therefore collapses almost immediately, but the field of coil 23 is maintained while capacitor 25 discharges and activates coil 23. Accordingly, coil 23 causes core 22 to remain activated, having originally been activated by coil 24, and to continue holding contactor 12 in closed contact position, despite that coil 24 no longer is activated. Thus, lamps 11 continue to glow.

In other words, lamps 11 glow during the two interval steps B and C above, while spring 21 is overcome by the magnetic core 22 due to the action of the coils, first by coil 24, and then by coil 23. The first interval, step B, takes place when coil 24 is energized and coil 23 is not energized. The second interval, step C, takes place when capacitor 25 discharges and coil 23 is thereby energized. Thus, there are two successive periods during which contactor 12 engages contact 15 and lamps 11 glow.

*Step D.*—After these two periods have expired, namely, after capacitor 25 has fully discharged, both coils are deactivated and therefore core 22 is demagnetized. Spring 21 now acts to move contactor 12 away from contact 15 to open the lamp circuit and the lamps 11 become dark and they remain dark through step D and then thereafter through step A until the start of step B when coil 24 again becomes fully energized to repeat the cycle.

Hence, during steps D and A, the lamps are dark, whereas during steps B and C the lamps glow.

In practice, coils 23 and 24 are balanced high resistance coils of approximately 900 ohms in combination with a capacitor 25 of approximately 250 $\mu f$. These ratings, however, may be altered as desired.

The lamps are of the conventional low power type lamps used in automobiles with a six or twelve volt battery.

It should be understood that the cyclical action of the circuit takes place only when the parts are properly connected as shown and when the switch 20 is closed.

Now having described the delayed action battery to ground flasher circuit for lamp loads heretofore described, reference should be had to the claims which follow.

What is claimed is:

1. A flashing control switch for use with a D.C. power source comprising, a pair of switch terminals, a magnetizable core, first and second operating coils of relatively high impedance wound on the core, said coils being connected in parallel between said switch terminals to be supplied in parallel with current from a D.C. power source connected between said switch terminals and to produce in the core upon such supply of current opposed magnetic forces which are substantially equal in magnitude, a contactor, spring biasing means for the contactor, the contactor being movable in one direction from a first to a second position in response to energization of the core by the unopposed magnetic force of one of the operating coils and movable in the opposite direction from the second to the first position under the action of the said spring biasing means, a capacitor connected in series with the second coil to be charged by current passing through the second coil and of such electric capacity that upon its discharge through the second coil it causes energization of the core sufficient for maintenance of the contactor in the said second position, a movable contact moved by the said contactor, another contact engaged by the said movable contact when the contactor is in the said second position, and short circuit means comprising the contactor establishing a short circuit of substantially zero impedance across the capacitor and the second coil when the movable contact and another contact are engaged.

2. A flashing control switch as defined in claim 1, wherein the impedance of each of the said operating coils is approximately 900 ohms.

3. A flashing control switch as defined in claim 1, wherein the magnetizing effect of the said first coil upon the core, and the magnetic effect of the core upon the contactor, are of such magnitude that their action upon the contactor to move it against the spring biasing means is sufficient to cause the said movable contact and another contact to engage audibly.

4. A flashing control switch for use with a D.C. power source comprising, a pair of switch terminals, a magnetizable core, first and second operating coils of relatively high impedance wound on the core, said coils being connected in parallel between said switch terminals to be supplied in parallel with current from a D.C. power source connected between the said switch terminals, and to produce in the core upon such supply of current opposed magnetic forces which are substantially equal in magnitude, an electrically-conductive contactor, spring biasing means for the contactor, the contactor being movable in one direction from a first to a second position in response to energization of the core by the unopposed magnetic force of one of the operating coils and movable in the opposite direction from the second to the first position under the action of the spring biasing means, a capacitor connected in series with the second coil to be charged by current passing through the second coil and of such electrical capacity that upon its discharge through the second coil it causes energization of the core sufficient for maintenance of the contactor in the second position, a movable contact moved by the said contactor, another contact engaged by the said movable contact when the contactor is in the said second position, the said electrically conductive contactor establishing a short circuit of substantially zero impedance across the capacitor and the second coil when the movable contact and another contact are engaged.

5. A flashing control switch as claimed in claim 4, wherein the impedance of each of the said operating coils is approximately 900 ohms.

6. A flashing control switch as claimed in claim 4, wherein the magnetizing effect of the said first coil upon the core, and the magnetic effect of the core upon the contactor, are of such magnitude that their action upon the contactor to move it against the spring biasing means is sufficient to cause the said movable contact and another contact to engage audibly.

7. A flashing control switch for use with a D.C. power source comprising, a pair of switch terminals, a magnetizable core, first and second essentially similar operating coils of relatively high impedance wound together on the core, said coils being connected in parallel between said switch terminals to be supplied in parallel with current from a D.C. power source connected between said switch terminals and to produce in the core upon such supply of current opposed magnetic forces which are substantially equal in magnitude, a contactor, spring biasing means for the contactor, the contactor being movable in one direction from a first to a second position in response to energization of the core by the unopposed magnetic force of one of the operating coils and movable in the opposite direction from the second to the first position under the action of the said spring biasing means, a capacitor connected in series with the second coil to be charged by current passing through the second coil and of such electric capacity that upon its discharge through the second coil it causes energization of the core sufficient for maintenance of the contactor in the said second position, a movable contact moved by the said contactor, another contact engaged by the said movable contact when the contactor is in the said second position, and short circuit means establishing a short circuit of substantially zero impedance across the capacitor and the second coil when the movable contact is moved by the contactor into engagement with the said another contact.

8. A flashing control switch as defined in claim 1, wherein the impedance of each of the said operating coils is approximately 900 ohms.

9. A flashing control switch as defined in claim 1, wherein the magnetic effect of the said first coil upon the core, and the magnetizing effect of the core upon the contactor, are of such magnitude that their action upon the contactor to move it against the spring biasing means is sufficient to cause the said movable contact and another contact to engage audibly.

References Cited by the Examiner

UNITED STATES PATENTS

| 1,811,858 | 6/1931 | Miller | 307—132 |
| 2,080,273 | 5/1937 | Holmes | 340—331 X |
| 2,208,125 | 7/1940 | Feingold. | |
| 2,221,867 | 11/1940 | Feingold. | |
| 2,895,082 | 7/1959 | Suyetani | 307—132 X |

OTHER REFERENCES

A.P.C. application of Schmidt, Serial No. 387,673, published May 18, 1943.

NEIL C. READ, *Primary Examiner.*